United States Patent
Reeves et al.

(10) Patent No.: US 8,856,690 B2
(45) Date of Patent: Oct. 7, 2014

(54) ASSOCIATING GESTURES ON A TOUCH SCREEN WITH CHARACTERS

(75) Inventors: Raymond Emilio Reeves, Olathe, KS (US); Ryan Alan Wick, Punta Gorda, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 1300 days.

(21) Appl. No.: 12/262,366

(22) Filed: Oct. 31, 2008

(65) Prior Publication Data

US 2010/0115473 A1    May 6, 2010

(51) Int. Cl.
*G06F 3/048* (2013.01)
*G06F 3/0488* (2013.01)

(52) U.S. Cl.
CPC .. *G06F 3/04883* (2013.01); *G06F 2203/04808* (2013.01)
USPC .......... 715/863; 715/761; 715/773; 345/157; 345/173

(58) Field of Classification Search
CPC ............................. G06F 3/04883; G06F 3/038
USPC .................. 715/761, 773, 863; 345/157, 173
See application file for complete search history.

(56) References Cited

U.S. PATENT DOCUMENTS

| | | |
|---|---|---|
| 5,535,421 A | 7/1996 | Weinreich |
| 6,104,317 A | 8/2000 | Panagrossi |
| 6,107,997 A | 8/2000 | Ure |
| 6,894,680 B1 | 5/2005 | Sasaki et al. |
| 2002/0180797 A1 | 12/2002 | Bachmann |
| 2003/0064736 A1* | 4/2003 | Bickerton et al. ............ 455/466 |
| 2004/0080488 A1 | 4/2004 | Lim |
| 2006/0055669 A1 | 3/2006 | Das |
| 2007/0075971 A1 | 4/2007 | Chun |
| 2008/0015115 A1 | 1/2008 | Guyot-Sionnest |
| 2009/0073136 A1* | 3/2009 | Choi ............................ 345/173 |
| 2009/0167684 A1* | 7/2009 | Kim et al. ..................... 345/161 |
| 2009/0249258 A1* | 10/2009 | Tang ............................. 715/863 |
| 2009/0273571 A1* | 11/2009 | Bowens ........................ 345/173 |
| 2009/0307631 A1* | 12/2009 | Kim et al. ..................... 715/830 |

FOREIGN PATENT DOCUMENTS

| | | |
|---|---|---|
| EP | 1067784 A2 | 1/2001 |
| EP | 1923778 A2 | 5/2008 |
| EP | 1933225 A2 | 6/2008 |
| WO | 2004063833 A | 7/2004 |
| WO | 2006094308 A2 | 9/2006 |
| WO | 2007089766 A2 | 8/2007 |
| WO | 2008075822 A | 6/2008 |
| WO | 2008130209 A | 10/2008 |
| WO | 2002095524 A | 7/2010 |

OTHER PUBLICATIONS

International Search Report with Written Opinion dated Apr. 8, 2010.

* cited by examiner

*Primary Examiner* — Tadeese Hailu (57) ABSTRACT

The present invention provides methods for associating a gesture, in contact with a touch screen, with a character. More specifically, the present invention links a user's movement on a surface of a device to represent a character. A character includes any number, letter, or symbol. For example, an illustrative embodiment of the present invention, a user may swipe a surface on their device such as a cell phone. The present invention recognizes the swipe to represent the number "0," a swipe in another direction to represent the number "1," a tap in the middle region to represent the number "2," etc.

17 Claims, 11 Drawing Sheets

ASSOCIATING GESTURES ON A TOUCH SCREEN WITH CHARACTERS

SUMMARY

The present invention is defined by the claims below. Embodiments of the present invention solve at least the problem of associating a gesture, in contact with a touch screen on a device, with characters. Illustrative embodiments of characters include numbers, letters, and symbols.

In a first aspect, media having computer-useable instructions perform a method of associating a gesture that is in contact with a surface of a device to a unique character. The gesture is received on the surface of the device. The gesture made on the surface of the device is recognized. Upon recognition of the gesture, the gesture is converted into a vector identified by Cartesian coordinates. The Cartesian coordinates determine a direction of the gesture. Based on the direction of the gesture, the unique character is assigned to represent the gesture.

In another aspect, media having computer-useable instructions perform a method of recognizing a gesture in association with a character. A surface of a device is divided into regions. The gesture is received in contact with the surface of the device in a first region of the regions. The gesture includes movements on the surface within a time frame. The gesture in the first region is converted into coordinates in the first region. The coordinates are associated with the character such that the gesture is associated with the character. An identical gesture received in a second region is associated with another character.

In yet another aspect, media having computer-useable instructions perform a method of providing a configuration that establishes how inputs are received into a computing device. A configuration is selected from configurations stored in the computing device. The configurations establish how gestures can be received on a surface of the computing device. The surface of the computing device is modified when the configuration is selected so that touches or movements on the surface are recognized respectively gestures. The gestures are mapped respectively to characters. The characters are displayed on a display device on the computing device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide media that implement methods for associating a gesture in contact with a touch screen with a character. More specifically, the present invention links a user's movement on a surface of a device to represent a character. For example, in an illustrative embodiment of the present invention, a user may swipe a surface on their device such as a cell phone. A swipe in a first direction may represent a number. The swipe in another direction may represent another number. A tap in a particular region may represent yet another number, and so forth.

Various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art. A skilled artisan may develop alternative means of implementing the aforementioned improvements without departing from the scope of the present invention.

Figure 1:
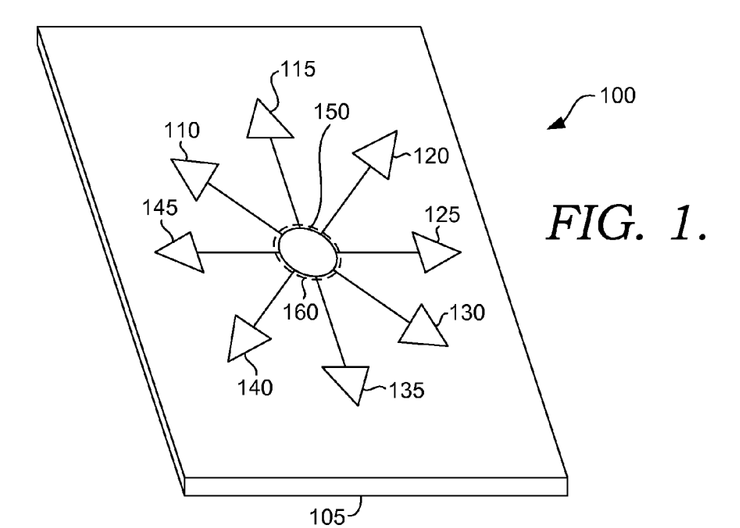
FIG. 1 illustrates a multi-directional movement configuration displayed on a surface in accordance with an embodiment of the present invention.

Turning now to FIG. 1, an exemplary surface 105 of a device is depicted in a multi-directional configuration and is referenced generally by the numeral 100. A user's movement creates gestures 110, 115, 120, 125, 130, 135, 140, 145, 150, and 160 which represent respectively a character. A character as described herein is any letter, number, or symbol. Other embodiments of the multi-directional configuration include a spoke-and-wheel configuration, a star configuration, or another configuration encompassing several directions. Although FIG. 1 depicts the multi-directional configuration in accordance with the present invention, the invention should not limited to the configurations that are discussed. For example, there may be a horizontal configuration, vertical configuration, or diagonal configuration that may be implemented. These different configurations shall be discussed further below.

The surface 105 is located on the device. The surface 105 enables the user to make the gestures 110, 115, 120, 125, 130, 135, 140, 145, 150, and 160 which are mapped to the respective character. One embodiment of the surface 105 includes a touch screen on the device. Embodiments of the device include a cell phone, a personal digital assistant (PDA), a laptop, or another portable computing device. For example, the user may make contact with the surface 105 and simultaneously create a sliding motion across the surface. This combination of actions of touching and sliding creates a gesture which culminates in a character.

Each of the gestures 110, 115, 120, 125, 130, 135, 140, 145, 150, and 160 are created by the user's movement to represent a different character. For example, the gesture 110 represents a different character from the gestures 115, 120, 125, 130, 135, 140, 145, 150, and 160. In this sense, although the gestures may look similar, they each represent a different character. The gestures in FIG. 1 are movements made by the user's finger, thumb, hand, appendage, or pointing tool. For simplification purposes, the user's finger, thumb, hand, appendage, or pointing tool shall be referred to as the user's appendage throughout. Embodiments of gestures 110, 115, 120, 125, 130, 135, 140, 145, 150, and 160 include a swipe, a slide, a sweeping movement, a tapping movement, a touch, a press, or another continuous movement made by the user in contact with the surface 105 of the device. For example, the gestures 150 and 160 include a tapping movement as made by the user's appendage to associate with either the number "0" or "5." A single tap represents the number "5" while a double tap represents the number "0." The gesture 120 includes a slide to the upper right-hand corner to represent the number "3."

The gesture 150 is recognized as a tap, a press, or a touch when the user's appendage maintains continuous contact with the surface 105 within a certain time frame. For example, the invention includes the recognition of the gesture 150 as the tap if the user removes the appendage from the surface within a time period. Otherwise, the invention may recognize the gesture as another movement such as a swipe. Additionally, the gesture 160 is recognized as a double tap, a double press, or a double touch to distinguish movement over the gesture 150. So, if two taps are recognized within a time period, the embodiment recognizes the two taps as a single gesture. Correspondingly, the two taps are associated with the number "0."

Each of the gestures 110, 115, 120, 125, 130, 135, 140, 145, 150, and 160 is oriented to be directed toward ten unique directions. The user can start at any point on the surface 105 and depending on the direction the user moves in the unique directions, a set of coordinates is assigned. The present invention is limited to just these directions as pictured in FIG. 1 and other embodiments may be implemented using different directions and orientations.

Having briefly described an overview of the embodiments of the present invention, a scenario of associating a gesture with a character is described herein. In an implementation of an embodiment of the present invention, a user may use their cell phone to call a number such as "123-4567." The present invention recognizes each gesture that the user makes and associates it to represent a number, such as the gesture 110 to represent the number "1," the gesture 115 to represent the number "2," the gesture 120 to represent the number "3," the gesture 145 to represent the number "4," the gesture 150 to represent the number "5," the gesture 125 to represent the number "6," and the gesture 140 to represent the number "7."

Figure 2:
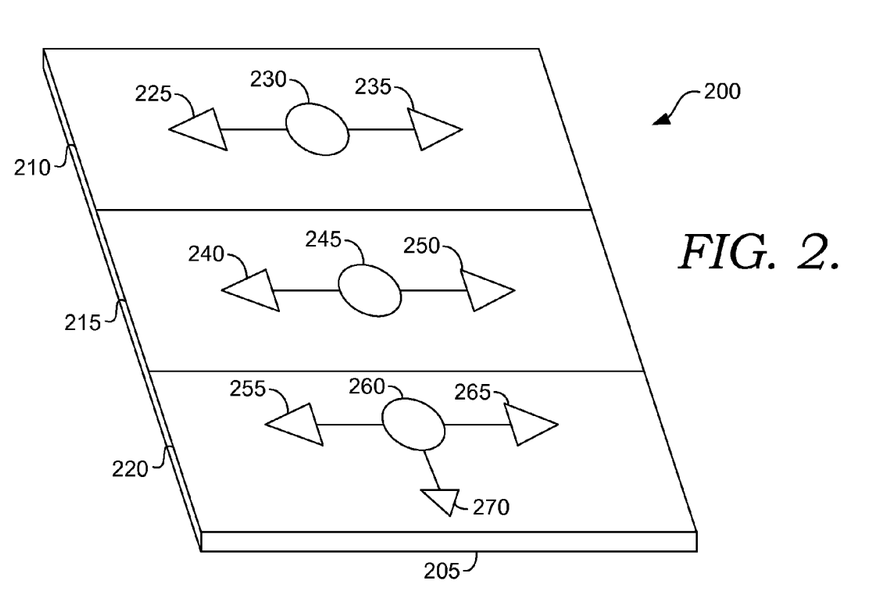
FIG. 2 illustrates a horizontal movement configuration displayed on a surface in accordance with an embodiment of the present invention.

Referring to FIG. 2, an exemplary surface 205 of a device is depicted in a horizontal configuration with horizontal regions 210, 215, and 220 and is referenced generally by the numeral 200. Within the horizontal regions 210, 215, and 220 a user's appendage produces gestures 225, 230, 235, 240, 245, 250, 255, 260, 265, and 270 that are converted to a set of coordinates which are associated with a character. Although FIG. 2 displays three horizontal regions 210, 215, and 220, the present invention is not limited to just these regions and other embodiments may be implemented with a different number of regions. For example, there may be one region, four regions, five regions, six regions, etc. The regions 210, 215, and 220 are also referred to as zones or sections and these names are interchangeably used throughout this document. Further, since there are gestures 225, 230, 235, 240, 245, 250, 255, 260, 265, and 270 in the figure, the present invention is not limited to these gestures. Other embodiments of the present invention may include more or fewer gestures.

The surface 205, also seen in FIG. 1 as surface 105, is located on a device for a user to provide the gestures 225, 230, 235, 240, 245, 250, 255, 260, 265 and 270. The gestures are converted respectively into a set of coordinates and respectively associated with a character. As discussed above in FIG. 1, embodiments of the device include a cell phone, a PDA, a laptop, or another portable computing device. The gestures 225, 230, 235, 240, 245, 250, 255, 260, 265, and 270 are converted into a vector or the set of coordinates when the gesture is made within one of the horizontal regions 210, 215, and 220 on the surface 205. Based on the vector or the set of coordinates, the gesture is associated with the character. In an implementation of an embodiment, the user may start anywhere within the region 210 to produce a sliding motion gesture to the left such as the gesture 225. This gesture 225 can occur on a touch screen of a cell phone. The gesture 225 is converted to a set of coordinates which are associated with the number "1."

The horizontal regions 210, 215, and 220 receive the gestures 225, 230, 235, 240, 245, 250, 255, 260, 265, and 270 to represent the corresponding character. The regions 210, 215, and 220 may be configured automatically or manually defined by the user. For example, a user may access a configuration page through a user interface to specify the number of regions and desired type of regions, e.g. horizontal, parallel, or diagonal. This is discussed further in FIG. 8. Although the gestures 225, 240, and 255 received in the regions 210, 215, and 220, respectively, are the same type of gestures such as a sliding motion to the left side of the surface 205, each of these gestures 225, 240, and 255 are received in a different region and converted to different sets of coordinates. In this manner, each gesture is converted to the set of coordinates or the vectors in the three different regions 210, 215, and 220 that are associated with the character. Thus, each gesture is associated with a different character. In this sense, the three identical gestures 225, 240, and 255 may seem similar but are received in the three different regions 210, 215, and 220 and are used to represent different characters.

The gestures 225, 230, 235, 240, 245, 250, 255, 260, 265, and 270 are movements made by the user's finger, thumb, hand, appendage, or pointing tool and for simplification purposes this will be referred to as the user's appendage throughout this document. Embodiments of the gestures 225, 230, 235, 240, 245, 250, 255, 260, 265, and 270 include a swipe, a slide, a sweeping movement, a tapping movement, a touch, a press, or another sort of continuous movement made by the user's appendage in contact with the surface 205 of the device. To create the gestures 225, 240, and 255, the user's appendage slides to the left by starting anywhere within the regions 210, 215, and 220, respectively. The gestures 230, 245, and 260 are created when the user use a single tap, a press, a touch, etc., within the regions 210, 215, and 220, respectively. The gestures 235, 250, and 260 are created when the user starts within the regions 210, 225, and 220, respectively, and slides to the right. The gesture 270 is created when the user starts within the region 220 and slides to the bottom of the screen.

Further, each of the ten gestures 225, 230, 235, 240, 245, 250, 255, 260, 265, and 270 are all produced by the user's movement in contact with the surface 205, but each represents a different character. For example, assume a user uses their index finger starting in region 210, to simulate gesture 235 by sliding to the right. The gesture 235 may represent the number "3." Thus, each time the user simulates the gesture 235 in the region 210, the invention associates the gesture 235 with the number "3." A further example includes a user, starting in the region 215, slides an appendage to the left to simulate the gesture 240 to associate with the number "4." The invention recognizes the gestures 230, 245, and 260 as taps, presses, or touches by determining the time period a user maintains continuous contact with surface 200. For example, the invention will recognize the gestures 230, 245, and 260 as taps, presses, or touches since the user maintains a shorter time frame of continuous contact with the surface 205 than the gestures 225, 235, 240, 250, 255, 265, and 270. The time frame for each gesture is discussed further in FIG. 8.

Additionally, the user can start at any point on surface 205 within the regions 210, 215, and 220, and depending on the direction the user moves in each of the regions 210, 215, or 220, a set of coordinates or a vector is assigned. Embodiments of the set of coordinates or vector include the Cartesian coordinate system, polar coordinate system, parabolic coordinate system, or other sort of two-dimensional coordinate system. For example, assume the bottom left-hand corner of the surface 205 has coordinates (0, 0). Then, if a user makes a tapping movement gesture 230 in region 210, the new coordinates may be (50, 100). A further example includes assuming the top right-hand corner having coordinates (0, 0). Then, gesture 260 may be (−50, −100). The set of coordinates will be explained in detail in FIG. 7. Based on the set of coordinates or the vector, each of the gestures 225, 230, 235, 240, 245, 250, 255, 260, 265, and 270 is associated with a different character.

Having briefly described an overview of the present invention, a scenario of utilizing a horizontal configuration to receive and recognize a gesture to associate with a character is described herein. In an implementation of an embodiment of the present invention, a user may choose to use their cell phone to dial a number such as "789-1166." The user may use a pointing tool to slide to the left of the cell phone surface to create the gesture 255 in the region 220. Assuming the top right corner of the cell phone surface is associated with coordinates (0, 0), the present invention converts the gesture 255 in the region 220 to the set of coordinates, (−100, −100) which is associated with the number "7." Using the pointing tool, the user presses down once in the region 220 to create the gesture 260. The present invention converts the gesture 260 in the region 220 to the set of coordinates (−50, −100) which is associated with the number "8." Sliding to the right with the pointing tool in the region 220, the user creates the gesture 265. The gesture 265 is converted to the coordinates (0, −100) which is associated with the number "9." The user slides to the left in the region 210 to create the gesture 225, which is converted to the coordinates (−100, 0) and is associated with the number "1." The user repeats this gesture twice to get another "1." The user slides to the right in the region 215 to create the gesture 250, which is converted to the coordinates (0, −50) and is associated with the number "6." The user repeats this gesture twice to get another "6" to dial the number "789-1166."

Figure 3A:
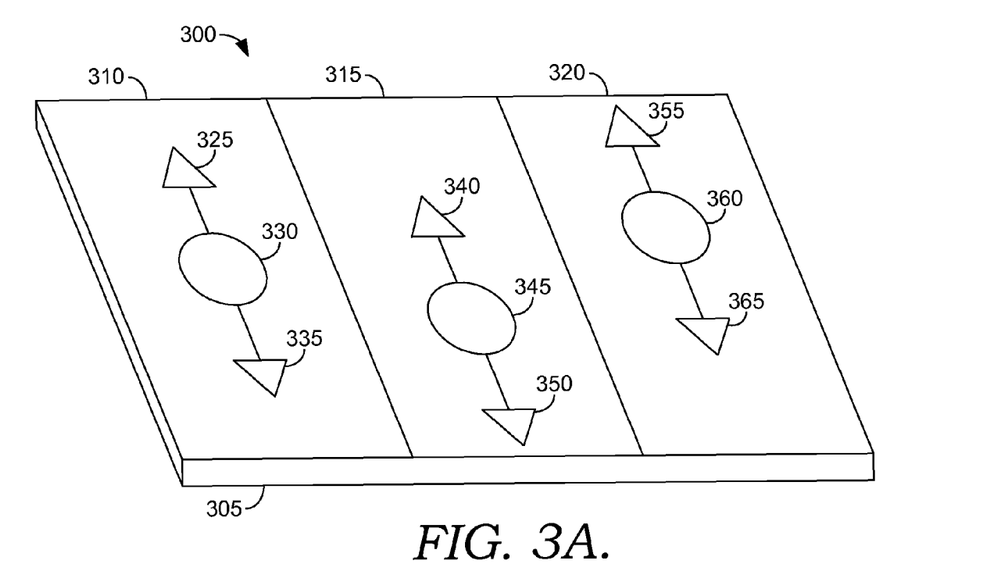
FIG. 3A illustrates a vertical movement configuration displayed on a surface in accordance with an embodiment of the present invention.

Referring now to FIG. 3A, an exemplary surface 305 of a device is implemented to practice the present invention and is referenced generally by the numeral 300. The surface 305, also seen as the surface 105 in FIG. 1 and the surface 205 in FIG. 2, is depicted in a vertical configuration with vertical regions 310, 315, and 320. Within the vertical regions 310, 315, and 320, a user's appendage produces gestures 325, 330, 335, 340, 345, 350, 355, 360, and 365 that are converted to a set of coordinates, which are associated with a character.

The vertical regions 310, 315, and 320 receive the gestures 325, 330, 335, 340, 345, 350, 355, 360, and 365 to represent the character. Embodiments of the vertical regions 310, 315, and 320 include configurations that are user defined or predefined by the present invention. Further, the invention should not be limited to just the regions depicted in FIG. 3A. For instance, there may be four regions, five regions, etc.

The gestures 325, 330, 335, 340, 345, 350, 355, 360 and 365 are converted to the set of coordinates which are associated with the character. The gestures 325, 340, and 355 are considered continuous contact sliding motions to the top of the surface 305 created by the user's appendage within the regions 310, 315, and 320, respectively. Embodiments of the gestures 330, 345, and 360 seen as the gestures 230, 245, and 260 in FIG. 2 include a single touch, tap, or press by the present invention. Embodiments of the gestures 325, 340, and 355 include an upward swipe, an upward slide, an upward sweeping movement, or another sort of upward continuous movement made by the user's appendage in contact with the surface 305 within the regions 310, 315, and 320, respectively. Embodiments of the gestures 335, 350, and 365 include a downward swipe, a downward slide, a downward sweeping movement, or another sort of downward continuous movement made by the user's appendage in contact with the surface 305 within the regions 310, 315, and 320.

Each of the gestures 325, 330, 335, 340, 345, 350, 355, 360, and 365 represents a unique character. The present invention senses each of the gestures 325, 330, 335, 340, 345, 350, 355, 360, and 365 and based on each of the directions, associates each of these gestures with the different set of coordinates as discussed in FIG. 2. Each of the different sets of coordinates is then associated with the unique character. Thus, based on each of the directions of these gestures, the present invention recognizes these gestures as representative of the unique character.

Figure 3B:
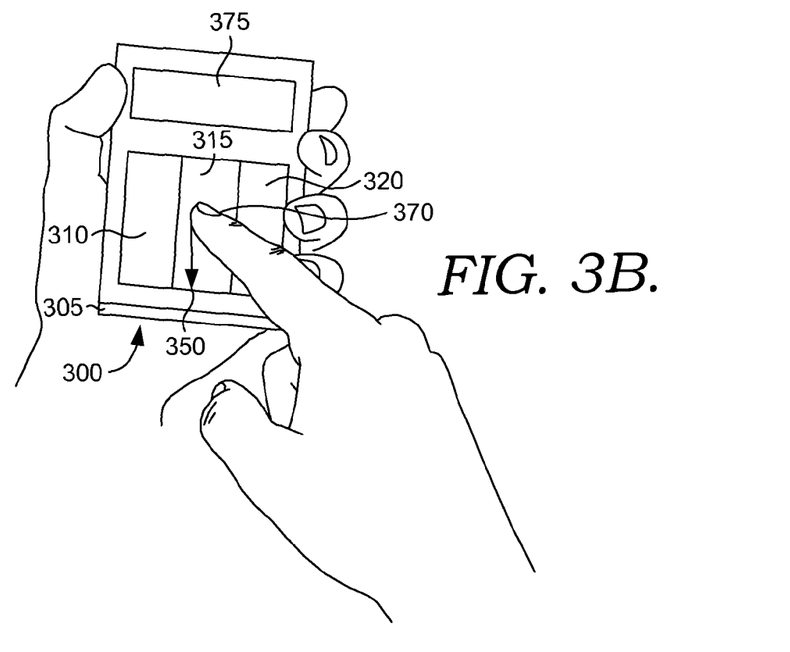
FIG. 3B illustrates an exemplary environment for receiving and recognizing a gesture on a surface of a device when implementing an embodiment of the present invention.

Turning to FIG. 3B, an embodiment of practicing the present invention is depicted and is referenced generally by the numeral 300. The surface 305 on the device, also depicted in FIG. 3A, illustrates receiving and recognizing the gesture 350 as made by a user's appendage 370 within the region 315 to represent and display a character on a display screen 375. The surface 305 includes a touch screen located on the device, divided into the regions 310, 315, and 320.

The regions 310, 315, and 320, also seen in FIG. 3A, on the surface 305 are depicted in the vertical configuration. One embodiment of the regions 305, 310, and 315 includes the horizontal regions 210, 215, and 220 illustrated in FIG. 2, and yet another embodiment includes the regions 310, 315, and 320 illustrated in a diagonal configuration.

The region 315 receives the gesture 350, also illustrated in FIG. 3A. The gesture 350 includes the user's appendage 370 in contact with the surface 305 to create a downward sliding movement. Although FIG. 3B depicts the gesture 350 at a start point in the middle of the region 315, the gesture 350 may start anywhere in the region 315. For example, the gesture 350 may start at the top of the region 315 or near the bottom of the region 315. In this sense, there may be an offset of the gesture 350. Based on this downward direction, the gesture 350 is associated with a set of coordinates. The set of coordinates is then associated with the character. The character is displayed in the display screen 375 on the device; this is further illustrated in FIG. 3C.

Figure 3C:
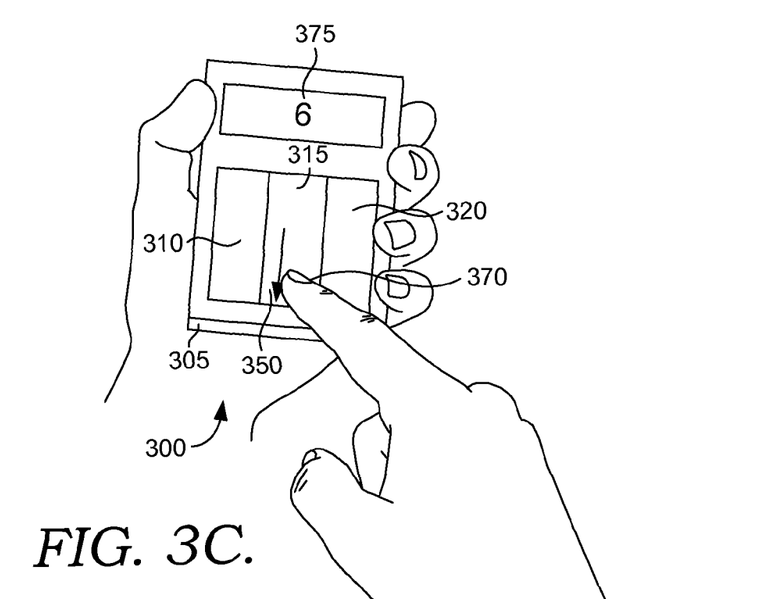
FIG. 3C illustrates an exemplary environment for associating a gesture made on a surface of a device with a character when implementing an embodiment of the present invention.

Now moving on to FIG. 3C, an embodiment of practicing the present invention is depicted and is referenced generally by the numeral 300. The surface 305 on the device, also depicted in FIG. 3A and FIG. 3B, illustrates receiving and recognizing the gesture 350 as made by the user's appendage 370 within the region 315 to represent and display the character on the display screen 375. The regions 310, 315, and 320 on the surface 305 also discussed in FIG. 3A and FIG. 3B, receive the gestures as created by the user's appendage 370.

In an implementation of an embodiment of the present invention, the user's appendage 370 is used to create a downward movement as depicted by the gesture 350. The present invention senses the gesture 350 and respectively assigns a set of coordinates. The set of coordinates are associated with the number "6" which is displayed on the display screen 375 to the user.

Figure 4A:
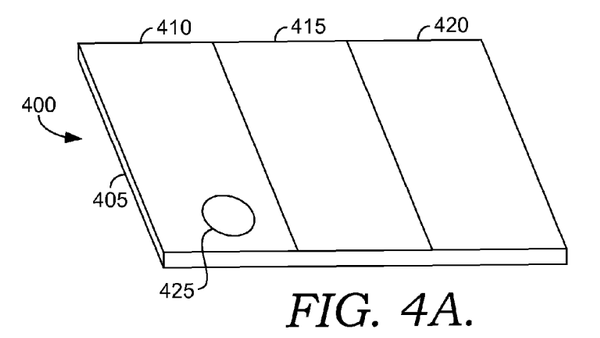
FIGS. 4A-C illustrate a surface of a device that is logically divided into zones that can receive single-touch, double-touch, or triple-touch gestures in a first zone that correspond respectively to characters.

Referring to FIG. 4A, a surface 405 of a device illustrates utilizing a single-touch gesture 425 in a zone 410 to represent a character and is referenced generally by the numeral 400. The surface 405 of the device, discussed as surface 105 in FIG. 1, surface 205 in FIG. 2, and surface 305 in FIG. 3A, FIG. 3B, and FIG. 3C, includes a touch screen surface on the device to receive the gesture 425.

Embodiments of the regions 410, 415, and 420, include the vertical configuration with the regions 310, 315, and 320 as depicted in FIG. 3A, FIG. 3B, and FIG. 3C or the horizontal configuration with the regions 210, 215, and 220 in FIG. 2.

Embodiments of the gesture 425 include a single-touch, a single-tap, or a single-press as created by a user's appendage in contact with the surface 405. The present invention senses the gesture 425 and converts the gesture 425 to a set of coordinates as previously discussed. The set of coordinates is then associated with a character. For example, the user's appendage 370 in FIG. 3C creates the single-touch gesture 425 which is converted to the set of coordinates to associate with the number "1."

Figure 4B:
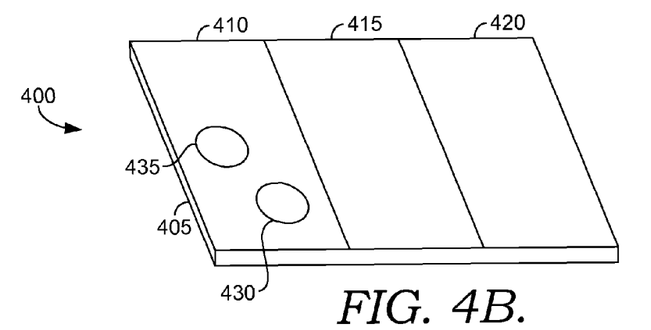

Turning to FIG. 4B, the surface 405 of the device illustrates utilizing two-touch gestures 430 and 435 in the zone 410 to represent the character and is referenced generally by the numeral 400. The surface 405 of the device, previously discussed in FIG. 4A, receives the two-touch gestures 430 and 435 and represents the gestures 430 and 435 as a character. The regions 410, 415, and 420 were already discussed in FIG. 4A.

The gestures 430 and 435 depict a two-touch gesture and embodiments include two-touch, two-press, two-tap, etc. The present invention senses the gestures 430 and 435 as a two-touch gesture by determining the overlap time period these gestures maintain contact with the surface 405. For example, the gesture 425 in FIG. 4A may be created by the user's finger in contact with the surface 405 and the gestures 430 and 435 may be created by two of the user's fingers in contact with the surface 405 at the same time. For example, the user may first place their index finger on the surface 405 to create the gesture 430 and then place the and middle finger on the surface 405 to create the gesture 435. These gestures 430 and 435 placed on the surface 405 during an overlapping time period represents the character.

Figure 4C:
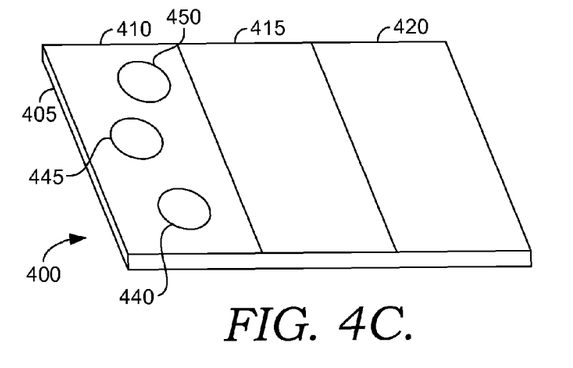

Turning to FIG. 4C, the surface 405 of the device illustrates utilizing multi-touch gestures 440, 445, and 450 in the zone 410 to represent the character and is referenced generally by the numeral 400.

The gestures 440, 445, and 450 depict the multi-touch gesture and embodiments include multi-touch, multi-taps, or multi-presses. Further, embodiments depict the gesture 440, 445, and 450 using more than three gestures such as using all five fingers on a hand, etc. For example, the user may utilize their index finger, middle finger, and ring finger to create the multi-touch in the region 410 to represent the character. As explained in FIG. 4B, each of the gestures 440, 445, and 450 must be in contact with the surface 405 at the same time to be considered the multi-touch gestures by the present invention.

Having described an overview of the embodiments of the present invention, a scenario of representing the character string, "123" through the previously discussed gestures 425, 430, 435, 440, 445, and 450 is described herein. For example, the user may choose to dial "123" by using the single-touch gesture 425 to represent the number "1," the two-touch gestures 430 and 435 to represent the number "2," and the multi-touch gestures 440, 445, and 450 to represent the number "3." In this example, each gesture, e.g. the single-touch gesture 425, the two-touch gestures 430 and 435, and the multi-touch gestures 440, 445, and 450 represent a different character. Further, the gestures 425, 430, 435, 440, 445, and 450 in FIG. 4A, FIG. 4B, and FIG. 4C represent different characters in the regions 415 and 420 than in the region 410.

Figure 5A:
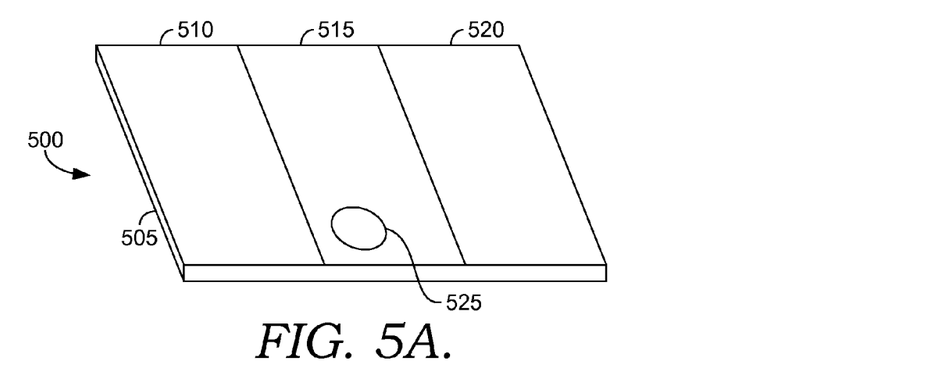
FIGS. 5A-C illustrate a surface of a device that is logically divided into zones that can receive single-touch, double-touch, or triple-touch gestures in a middle zone that correspond respectively to characters.

Referring to FIG. 5A, a surface 505 of a device illustrates utilizing a single touch gesture 525 in a region 515 to represent a character and is referenced generally by the numeral 500. The surface 505 of the device, discussed as surface 405 in FIG. 4A, FIG. 4B, and FIG. 4C includes a touch screen surface on the device to receive the gesture 525. Embodiments of the regions 510, 515, and 520, discussed as the regions 410, 415, and 420 in FIG. 4, include the vertical configuration with the regions 310, 315, and 320 as depicted in FIG. 3A, FIG. 3B, and FIG. 3C or the horizontal configuration with the regions 210, 215, and 220 in FIG. 2. Although in FIG. 5A, the region 515 receives the gesture 525 and is considered a first zone, the region 520 as a second zone, and the region 510 as a third zone, these regions 510, 515, and 520 should not be limited to just this example. For instance, the regions 510, 515, and 520 may also be considered the third zone, the second zone, and the first zone, respectively. Further, as mentioned in FIG. 4A, there may be four regions, five regions, etc.

The single-touch gesture 525, discussed as single-touch gesture 425 in FIG. 4A, is received in the region 515 to represent a character. The present invention senses the gesture 525 and converts the gesture to a set of coordinates which is then associated with a character. For example, a user may utilize their finger 370 in FIG. 3C to create the single-touch gesture 525 which is converted to a set of coordinates to associate with the number "0."

Figure 5B:
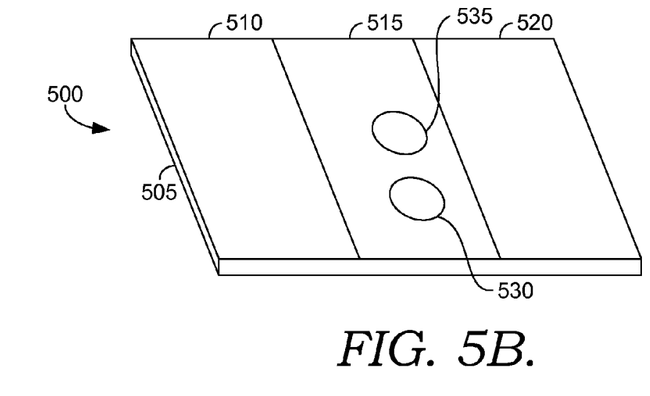

Turning to FIG. 5B, the surface 505 of the device illustrates utilizing a two-touch gesture 530 and 535 in the region 515 to represent the character and is referenced generally by the numeral 500. The surface 505 of the device, previously discussed in FIG. 5A, receives the two-touch gesture 530 and 535 and represents these gestures as the character. The regions 510, 515, and 520 already discussed in FIG. 5A, may receive the two-gesture 530 and 535 in other regions not depicted in FIG. 5B. This is discussed further in FIG. 6B.

Embodiments of the two-touch gesture 530 and 535, also seen as the two-touch gesture 430 and 435 in FIG. 4B, includes sensing the gestures 530 and 535 as a two-touch gesture by determining the overlap time period with these gestures touching the surface 505 at the same time. For example, the single-touch gesture 525 in FIG. 5A may be created by the user's finger in contact with the surface 505 and the two-touch gestures 530 and 535 may be created by two of the user's fingers in contact with the surface 505 at the same time within the region 515.

Figure 5C:
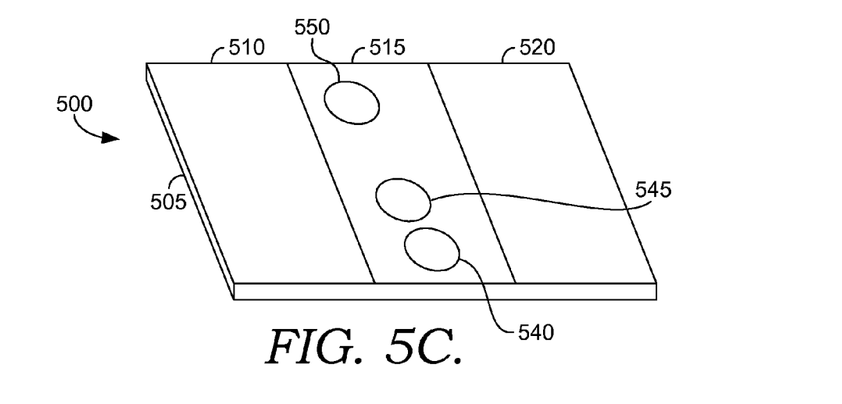

Turning to FIG. 5C, the surface 505 of the device illustrates utilizing multi-touch gestures 540, 545, and 550 in the region 515 to represent a character and is referenced generally by the numeral 500.

Embodiments of the multi-touch gestures 540, 545, and 550, also depicted as the multi-touch gestures 440, 445, and 450 in FIG. 4C, may use more than three gestures such as using all five fingers on a hand, etc. For example, the user may utilize their index finger, middle finger, and ring finger to create the multi-touch in the region 515 to represent the character. As explained in FIG. 5B, each of the gestures 540, 545, and 550 must be in contact with the surface 505 at the same time to be considered the multi-touch gestures by the present invention.

In an implementation of an embodiment of the present invention, the user may use the previously discussed gestures 525, 530, 535, 540, 545, and 550 to represent the character string, "456." For example, the user may choose to dial "456" by using the single-touch gesture 525 to represent the number "4," the two-touch gestures 530 and 535 to represent the number "5," and the multi-touch gestures 540, 545, and 550 to represent the number "6."

Figure 6A:
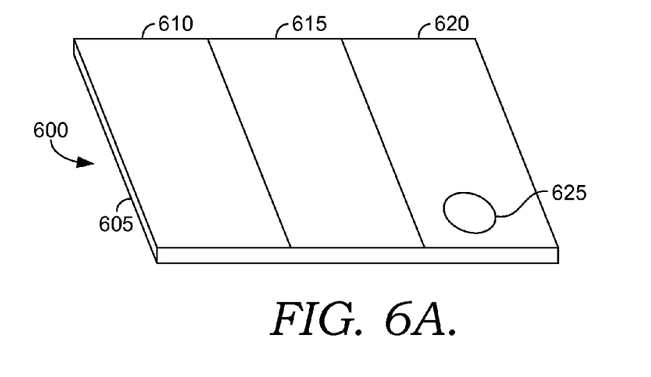
FIGS. 6A-C illustrate a surface of a device that is logically divided into zones that can receive single-touch, double-touch, or triple-touch gestures in a last zone that correspond respectively to characters.

Referring to FIG. 6A, a surface 605 of a device illustrates utilizing a single touch gesture 625 in a region 620 to represent a character and is referenced generally by the numeral 600. The surface 605 of the device, discussed as the surface 405 in FIG. 4A, FIG. 4B, and FIG. 4C and as the surface 505 in FIG. 5A, FIG. 5B, and FIG. 5C, receives the single-touch gesture 625. Embodiments of the regions 610, 615, and 620, discussed as the regions 510, 515, and 520 in FIG. 5A, include the vertical configuration with the regions 310, 315, and 320 as depicted in FIG. 3A, FIG. 3B, and FIG. 3C or the horizontal configuration with the regions 210, 215, and 220 in FIG. 2. Further, as mentioned in FIG. 4A, there may be four regions, five regions, etc.

Embodiments of the single-touch gesture 625, discussed as the single-touch gesture 425 in FIG. 4A and the single-touch gesture 525 in FIG. 5A, is received in the region 620 to represent a character. The present invention senses the gesture 625 and converts the gesture to a set of coordinates which is then associated with a character. For example, a user may utilize their finger 370 in FIG. 3C to create the single-touch gesture 625 which is converted to a set of coordinates to associate with the number "7."

The single-touch gesture 625 within the region 620, also seen as the gesture 425 received in the region 420 in FIG. 4A and the gesture 525 received in the region 515 in FIG. 5A are all similar gestures; however, each is received in a different zone and thus converted to a different set of coordinates. Thus, each of these single-touch gestures 425, 525, and 625 represent a different character. For example, the single-touch gesture 425 depicted in FIG. 4A represents a different character than the single-touch gesture 525 in FIG. 5A and the single-touch gesture 625 in FIG. 6A. A further example includes the user's finger 370, as seen in FIG. 3B, creating the single-touch gesture 425 in the region 410 in FIG. 4A to represent the number "1." The single-touch gesture 525 the region 510 in FIG. 5A to represent the number "4" and the single-touch gesture 625 in the region 610 in FIG. 6A to represent the number "7."

Figure 6B:
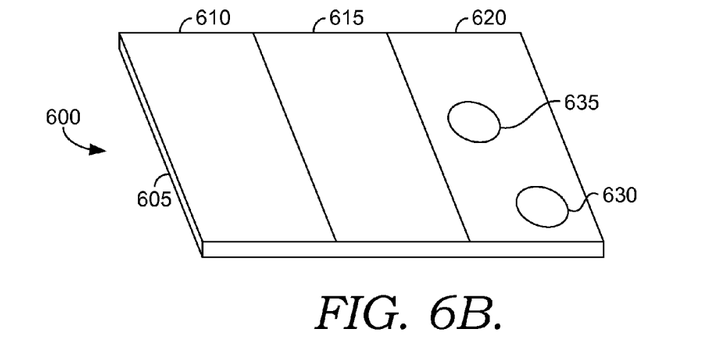

Turning to FIG. 6B, the surface 605 of the device illustrates utilizing a two-touch gesture 630 and 635 in the region 620 to represent the character and is referenced generally by the numeral 600. The surface 605 of the device, previously discussed in FIG. 6A, receives the two-touch gestures 630 and 635 and represents this gesture as the character. The present invention senses the gesture 630 and 635 as the two-touch gesture by determining an overlap time period with the gestures touching the surface 605 at the same time. For example, the single-touch gesture 625 in FIG. 6A may be created by the user's finger in contact with the surface 605 and the two-touch gesture 630 and 635 may be created by two of the user's fingers in contact with the surface 605 at the same time within the region 620.

Figure 6C:
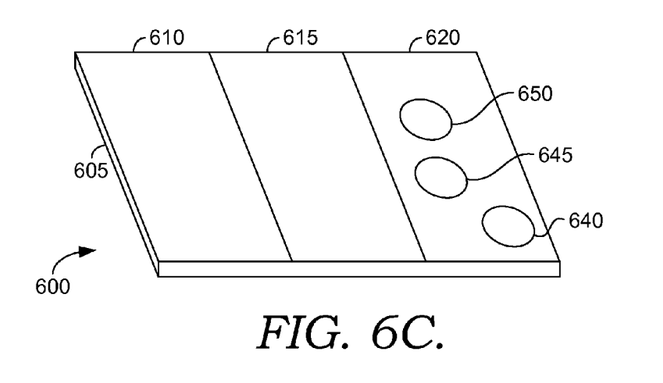

Turning to FIG. 6C, the surface 605 of the device illustrates utilizing a multi-touch gesture 640, 645, and 650 in the region 620 to represent the character and is referenced generally by the numeral 600.

Embodiments of the multi-touch gestures 640, 645, and 650, also depicted as the multi-touch gestures 540, 545, and 550 in FIG. 5C, include multi-touch, multi-taps, or multi-presses. Further embodiments depict the multi-touch gestures 640, 645, and 650 using more than three gestures such as using all five fingers on a hand, etc. For example, the user may utilize their index finger, middle finger, and ring finger to create the multi-touch gesture in the region 620 to represent the character. As explained in FIG. 6B, each of the gesture 640, 645, and 650 must be in contact with the surface 605 at the same time to be considered the multi-touch gestures by the present invention.

In an implementation of an embodiment of the present invention, the user may use the previously discussed gestures 625, 630, 635, 640, 645, and 650 to represent the character string, "789." For example, the user may choose to dial "789" by using the single-touch gesture 625 to represent the number "7," the two-touch gestures 630 and 635 to represent the number "8," and the multi-touch gestures 640, 645, and 650 to represent the number "9."

Figure 7:
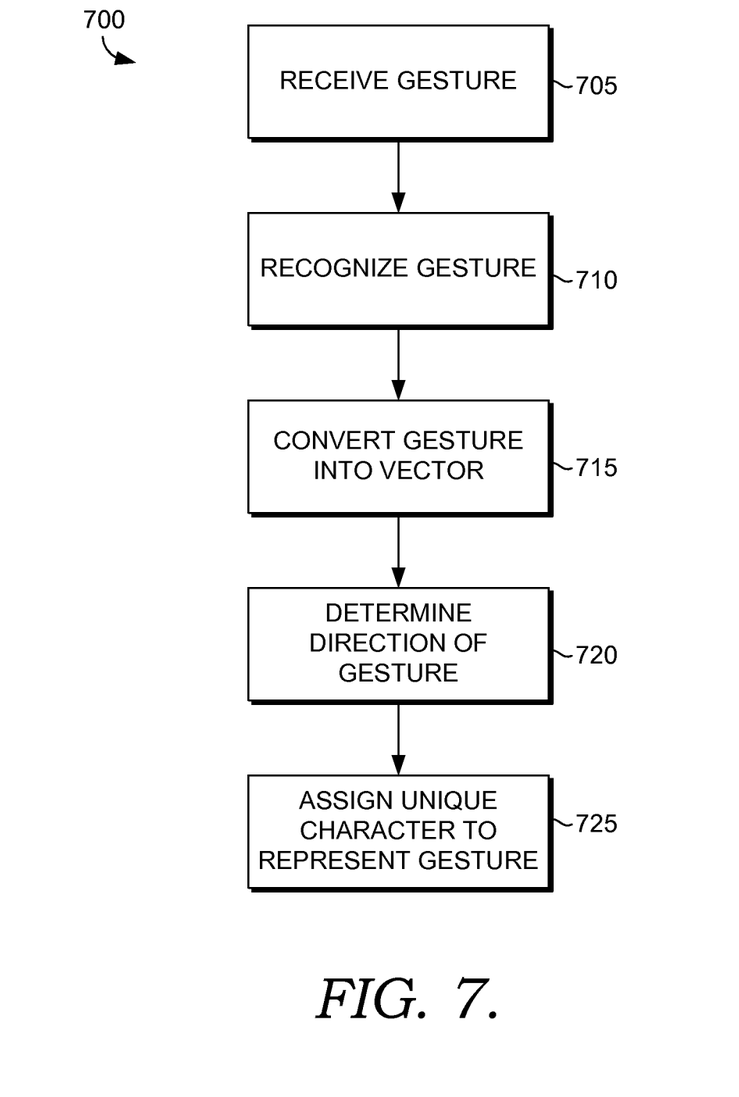
FIG. 7 depicts an exemplary flowchart for associating a gesture in contact with a surface of a device to a unique character when implementing an embodiment of the present invention.

Referring to FIG. 7, an exemplary flow diagram is depicted for associating a gesture in contact with a surface of a device to a unique character in accordance with an embodiment of the present invention and is referenced generally by the numeral 700. The process starts at step 705 to receive a gesture on a surface of a device, and then at step 710, the present invention recognizes the gesture. Next, at steps 715 and 720, the gesture is converted into a vector to determine a direction of the gesture. At step 725, the unique character is assigned to represent the gesture based on the direction of the gesture at step 720.

At step 705, the process starts when the gesture is received on the surface of the device. An embodiment of the surface includes a touch screen on the device. Embodiments of the device include a cell phone, a personal digital assistant (PDA), a laptop, or other sort of portable computing device. An embodiment of the step 705 include at least one gesture from the gestures 110, 115, 120, 125, 130, 135, 140, 145, or 150 received on the surface 105 of the device as seen in FIG. 1. Another embodiment of step 705 includes at least one gesture from the gestures 225, 230, 235, 240, 245, 250, 255, 260, 265, and 270 received within one of the regions 210, 215, or 220 on the surface 205 of the device in FIG. 2. Further, another embodiment includes at least one of the gestures 325, 330, 335, 340, 345, 350, 355, 360, or 365 received within one of the regions 310, 315, or 320 on the surface 305 of the device in FIG. 3A. Yet, a further embodiment of step 705 includes the user's appendage 370 creating the gesture 350 received in the region 315 on the surface 305 of the device in FIG. 3B.

Next, at step 710, the gesture received at the step 705 is recognized on the surface of the device. An embodiment of step the 710 includes sensing the gesture within a time frame. Another embodiment of the step 710 includes recognizing the gesture from a certain pressure threshold. For example, a user may lightly brush the surface of the device. In this sense, the process can distinguish an inadvertent gesture from the intended gesture to represent a character.

At step 715, the gesture recognized at the step 710 is converted into the vector. Embodiments of the vector include the set of coordinates which may include a Cartesian coordinate system, a polar coordinate system, a parabolic coordinate system, or another sort of two-dimensional coordinate system. Embodiments of step 715 include the gesture 110, 115, 120, 125, 130, 135, 140, 145, or 150 received on the surface 105 of the device as seen in FIG. 1, being converted to the set of coordinates. Another embodiment of this step 715 includes the gesture 225, 230, 235, 240, 245, 250, 255, 260, 265, or 270 received within one of the regions 210, 215, or 220 on the surface 205 of the device in FIG. 2, converted to the set of coordinates. Further, another embodiment of this step 715 includes the gesture 325, 330, 335, 340, 345, 350, 355, 360, or 365 received within one of the regions 310, 315, or 320 on the surface 305 of the device in FIG. 3A, converted to the set of coordinates. For example, the user's appendage 370 creates the gesture 350 by moving downward while in the region 315 while continuous contact with the surface 305 of the device in FIG. 3B. The gesture 350 may be converted into the set of Cartesian coordinates such as (−50, −100).

At step 720, the direction of the gesture is determined based on the vector at the step 715. For instance, following with the previous example, assume the top right corner of the surface of device has the coordinates (0, 0) then the gesture 350 converted into the coordinates (−50, −100) indicates the gesture is directed towards the bottom part of the screen in the region 315 in FIG. 3B. In this case, the process can distinguish this gesture 350 from the other gestures 325, 330, 335, 340, 345, 355, 360 or 365 in FIG. 3A.

At step 725, the unique character is assigned to the gesture based on the direction of the vector in the step 720. An embodiment of this step 725 includes the number "6" as indicated on the display screen 375 to represent the gesture 350 in FIG. 3C. Another embodiment includes each of the ten gestures 110, 115, 120, 125, 130, 135, 140, 145, 150 or 160 as seen in FIG. 1, being converted to the different set of coordinates. Based on the direction in each of the sets of coordinates, the unique character is assigned. For example, the gesture 110 represents the number "1," the gesture 115 represents the number "2," the gesture 120 represents the number "3," the gesture 125 represents the number "4," etc. Thus, each of the ten gestures 110, 115, 120, 125, 130, 135, 140, 145, 150 or 160 has a unique direction based on the set of coordinates and each is associated with the unique character.

Figures 8, 9:
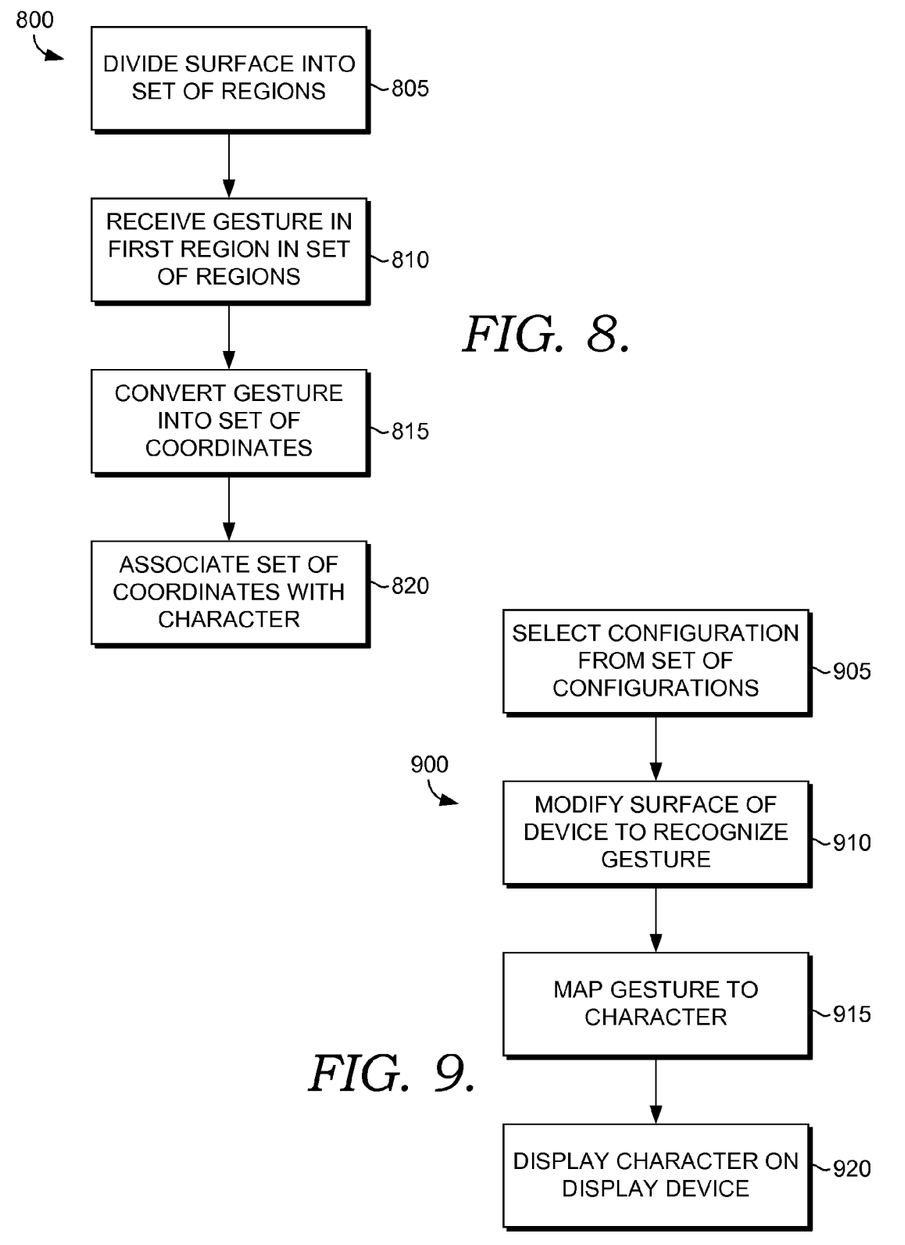
FIG. 8 illustrates an exemplary flowchart for recognizing a gesture and associating it to a character when implementing an embodiment of the present invention.
FIG. 9 illustrates an exemplary flowchart for providing a configuration that establishes how inputs are received into a computing device when implementing an embodiment of the present invention.

Referring to FIG. 8, an exemplary flow diagram is depicted for recognizing a gesture in association with a character in accordance with an embodiment of the present invention and is referenced generally by the numeral 800. The process starts at step 805 to divide a surface of a computing device into a set of regions. Next, at step 810, a gesture is received in a first region in the set of regions. At steps 815 and 820, the gesture is converted into a set of coordinates and the coordinates are associated with the character.

At step 805, the surface is divided into the set of regions. This may include a user-defined configuration or a pre-defined configuration. For example, the user may utilize a user interface to specify the number of regions and desired type of regions, i.e. horizontal, parallel, or diagonal. An embodiment of this step 805 includes dividing the surface 205 of the device in FIG. 2 into the horizontal regions 210, 215, and 220. Another embodiment of step 805 includes dividing the surface 305 in FIG. 3A into the vertical regions 310, 315, and 320.

At step 810, the gesture is received in the first region in the set of regions. Embodiments of this step include the gesture 350 created by the user's appendage 370 within the region 315 as seen in FIG. 3C. The set of regions includes the regions 310, 315, and 320 to receive the first gesture 350 within the first region 315. Any of the vertical regions 310, 315, and 320 in FIG. 3A may be considered a first region since it depends in which region the first gesture is received. A further embodiment includes the gesture 355 created in an upward swipe in the first region 320 in FIG. 3A. An additional embodiment includes receiving the gesture 230 within the first region 210 in FIG. 2. As mentioned previously, any of the horizontal regions 210, 215, and 220 in FIG. 2 may be considered the first region.

At step 815, as depicted at steps 715 and 720 in FIG. 7, the gesture received at the step 810 is converted into the set of coordinates. At step 820, as depicted at step 725 in FIG. 7, the set of coordinates in step 815 is associated with the character.

Referring to FIG. 9, an exemplary flow diagram is depicted for providing a configuration that establishes how inputs are received into a computing device in accordance with an embodiment of the present invention and is referenced generally by the numeral 900. The process starts at step 905 to select the configuration from a set of configurations stored on the computing device, and then at step 910, the present invention modifies the surface of the computing device to recognize a gesture. Next, at steps 915 and 920, the gesture is mapped to a character and the character is displayed on a display device on the computing device.

At step 905, the configuration is selected from the set of configurations stored on the computing device to establish how the gesture is to be received. An embodiment of this step, as seen in FIG. 8 at the step 805, of dividing the surface of the computing device into the set of regions. Another embodiment of this step 905 includes the multi-directional configuration as seen in FIG. 1, the horizontal configuration as seen in FIG. 2, or the vertical configuration as seen in FIG. 3A. The gestures are received based on each of the configurations. For example, the gestures 225, 230, 235, 240, 245, 250, 255, 260, 265 and 270 corresponding to the horizontal configuration in FIG. 2 are created and received in a different manner compared to the gestures 325, 330, 335, 340, 345, 350, 355, 360 and 365 corresponding to the vertical configuration in FIG. 3A.

At step 910, the surface of the computing device is modified when the configuration is selected so a movement in contact with the surface of the computing device is recognized as the gesture. As explained at the step 905, embodiments of this step 910 include modifying the surface of the device to include the multi-directional configuration in FIG. 1, the horizontal configuration in FIG. 2, or the vertical configuration in FIG. 3A. Based on each of the configurations, the gestures are recognized.

At step 915, the gestures as recognized at the step 910 are mapped to the character. Embodiments of step 915 include step 725 in FIG. 7 to assign a unique character to represent the gestures. A further embodiment includes the gesture 350 mapped to the number "6" as seen in FIG. 3C.

At step 920, the character is displayed on the device in the computing device. An embodiment of this step includes the number "6" as indicated on the display screen 375 to represent the gesture 350 in FIG. 3C.

Figure 10:
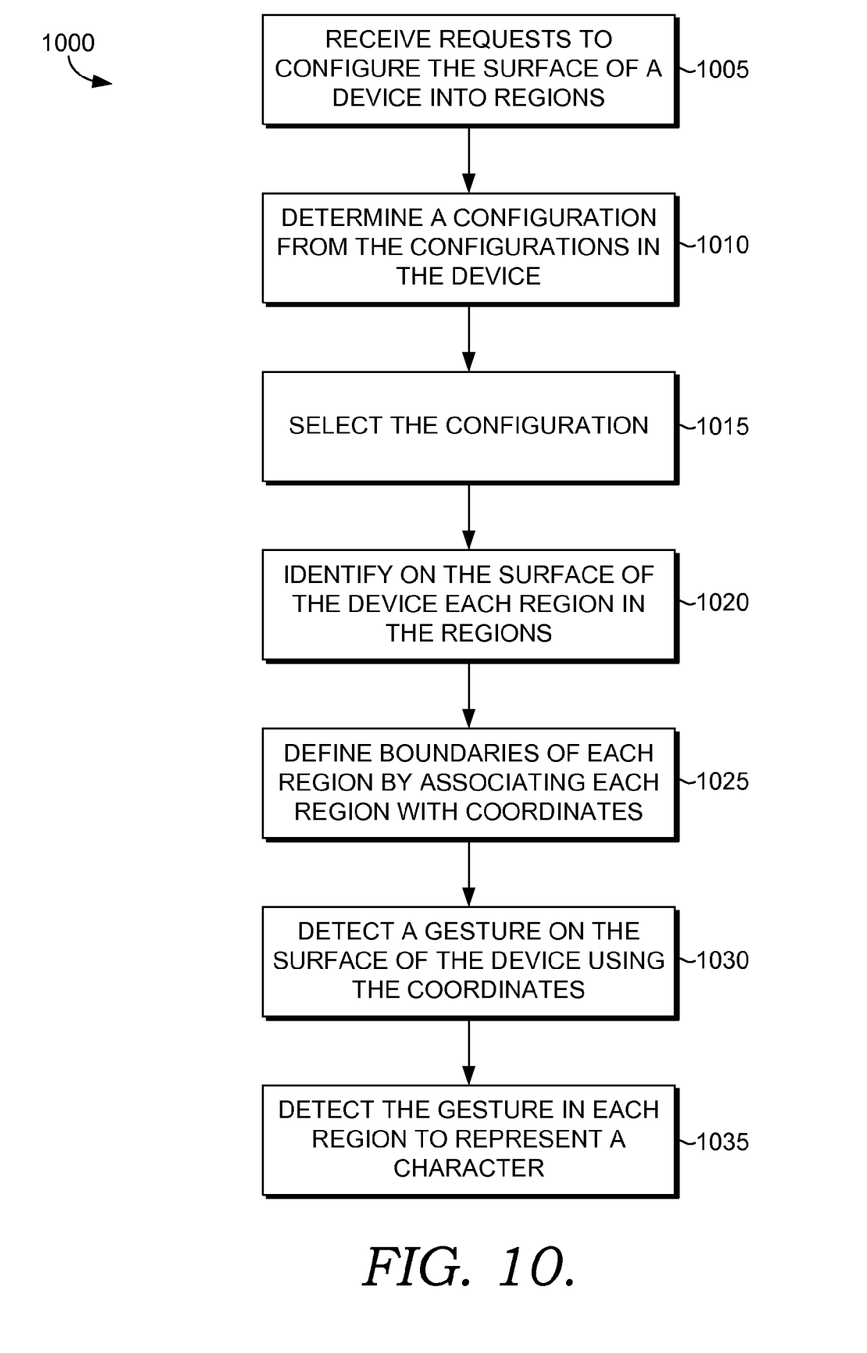
FIG. 10 illustrates an exemplary flowchart for configuring a surface of a device into a set of regions when implementing an embodiment of the present invention.

In FIG. 10, a process for configuring a surface of a device into a set of regions is shown in a method 1000. In a step 1005, a request is received to configure the surface (205 and 305) of a device into regions (210, 215, 220, 310, 315, and 320). In a step 1010, a configuration is determined from the configurations in the device. The configuration is selected in a step 1015. Each region is identified on the surface of the device in a step 1020. In a step 1025, the boundaries of each region are defined by associating with coordinates. Once each region is defined and established, a gesture is detected on the surface of the devices using the coordinates in a step 1030. In a step 1035, the gesture is detected in each region to represent a character.

Figure 11:
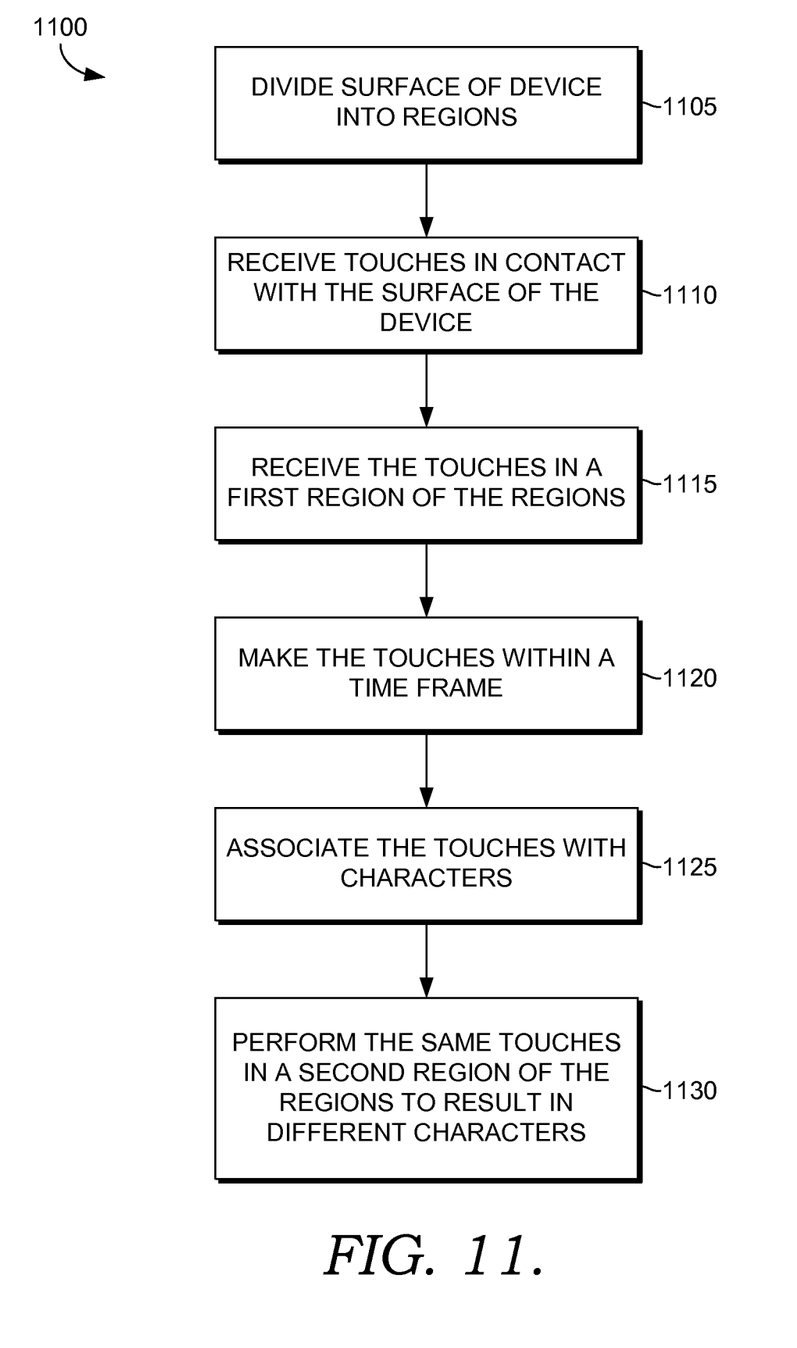
FIG. 11 illustrates an exemplary flowchart for recognizing touches in association with a character when implementing an embodiment of the present invention.

Turning now to FIG. 11, a process for recognizing touches in association with a character is shown in a method 1100. In a step 1105, a surface (205 and 305) of a device is divided into regions (210, 215, 220, 310, 315, and 320). Touches are received in contact with the surface of the device in a step 1110. In a step 1115, touches are received in a first region of the regions (210, 215, 220, 310, 315, and 320). When the touches are made, a timer records the amount of time between touches. The touches are made within a time frame in a step 1120. In a step 1125, the touches are associated with characters. In a step 1130, the same touches performed in a second region of the regions result in different characters.

Figure 12:
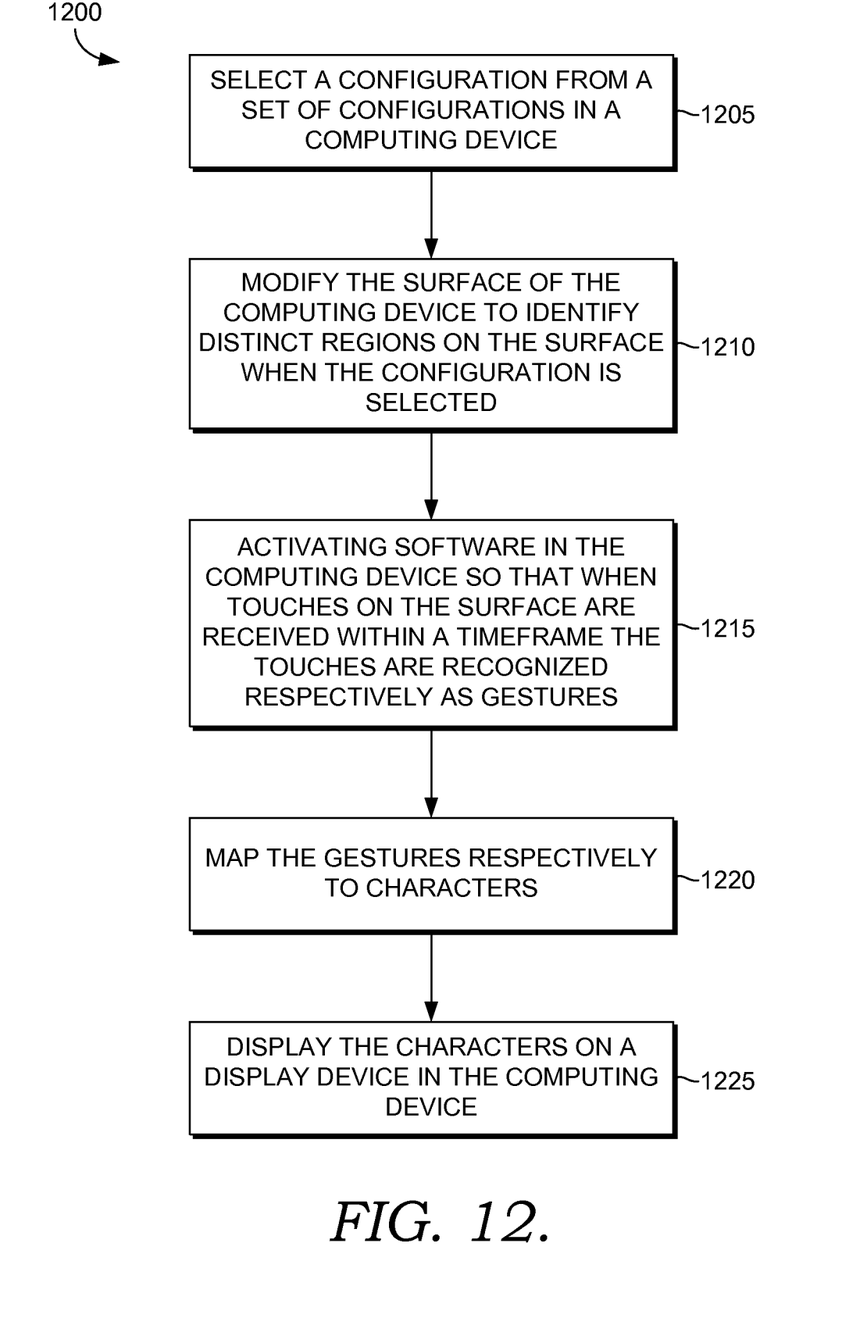
FIG. 12 illustrates another exemplary flowchart for providing configurations that establish how inputs are received into a computing device when implementing an embodiment of the present invention.

In FIG. 12, a process for providing configurations that establish how inputs are received into a computing device is shown in a method 1200. In a step 1205, a configuration is selected from a set of configurations in a computing device. In a step 1210, based on the type of configuration that is selected, the surface of the computing device is modified to identify distinct regions on the surface. Software is activated in the computing device so that when touches on the surface are received within a time frame, the touches are recognized respectively as gestures (step 1215). In a step 1220, the gestures are mapped respectively to characters. In a step 1225, the characters are displayed on a display device in the computing device.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable storage media having computer-useable instructions embodied thereon for performing a method of associating a gesture that is in contact with a surface of a device to a unique character, the method comprising:
   receiving the gesture at any point on the surface of the device, wherein the gesture is selected from a group including movements by a finger, thumb, hand, or appendage;
   recognizing the gesture made on the surface of the device;
   upon recognition of the gesture, converting the gesture at the device into a vector identified by a set of Cartesian coordinates wherein the set of Cartesian coordinates determine at least a direction of the gesture;
   based on the at least the direction of the gesture, assigning the unique character to represent the gesture;
   displaying the unique character on a display device when the gesture is received; and
   based on an offset of the direction of the gesture, assigning an identical unique character to represent the gesture, and based on a change in the direction to represent a new gesture, assigning another unique character to represent the new gesture.

2. The media of claim 1, wherein recognizing the gesture made on the surface of the device comprises recognizing the gesture made on the surface of the device within a time frame.

3. The media of claim 2, further comprising selecting a configuration from a set of configurations stored in the device, wherein the set of configurations establishes how the gesture can be received on the surface of the device.

4. The media of claim 1, wherein the gesture includes a swipe, a sweeping motion, a tapping movement, or other sort of continuous movement made by a user in contact with the surface of the device.

5. The media of claim 1, wherein the unique character includes a letter, a symbol, or a number.

6. One or more computer-readable storage media having computer-useable instructions embodied thereon for performing a method of recognizing a gesture in association with a character, the method comprising:
   dividing a surface of a device into a set of adjacent regions, wherein the surface is devoid of characters;
   receiving the gesture in contact with the surface of the device in a first region of the set of regions, wherein the gesture includes one or more movements on the surface within a time frame;
   converting the gesture in the first region into a set of coordinates in the first region; and
   associating the set of coordinates with the character such that the gesture is associated with the character, wherein an identical gesture received in a second region is associated with another character.

7. The media of claim 6, wherein the character includes a letter, a symbol, or a number.

8. The media of claim 7, wherein the gesture includes a swipe, a sweeping motion, a tapping movement, or other sort of continuous movement made by a user in contact with the surface of the device.

9. The media of claim 7, wherein converting the gesture in the first region into the set of coordinates in the first region comprises converting the gesture in the first region into a set of Cartesian coordinates.

10. The media of claim 6, wherein dividing the surface of the device into the set of regions comprises dividing the surface of the device into a set of horizontal regions having three parallel horizontal regions, a set of vertical regions having three parallel vertical regions, or a set of diagonal regions having three parallel diagonal regions.

11. The media of claim 6, further comprising displaying the character on a display screen on the device.

12. One or more computer-readable storage media having computer-useable instructions embodied thereon for performing a method of providing configurations that establish how inputs are received into a computing device, the method comprising:
  selecting a configuration from a set of configurations stored in the computing device, wherein the set of configurations establishes how a set of gestures can be received on a surface of the computing device, wherein only one configuration is operable at a time when selected;
  modifying the surface of the computing device when the configuration is selected so that one or more touches or one or more movements on the surface are recognized respectively as one or more gestures;
  mapping the one or more gestures respectively to one or more characters;
  displaying the one or more characters on a display device in the computing device; and
  converting the one or more gestures into a set of coordinates.

13. The media of claim 12, further comprising selecting a first configuration from the set of configurations, wherein the first configuration converts the one or more gestures into one or more vectors identified by Cartesian coordinates, wherein the Cartesian coordinates determine a direction of the one or more gestures.

14. The media of claim 12, further comprising selecting a second configuration from the set of configurations, wherein the second configuration receives one or more gestures in one or more regions located on the surface of the computing device, wherein the surface is divided into a set of regions.

15. The media of claim 12, wherein the one or more gestures include a swipe, a sweeping motion, a tapping movement, or other sort of continuous movement made by a user in contact with the surface of the computing device.

16. The media of claim 12, wherein selecting the configuration from the set of configurations stored in the computing device comprises selecting a horizontal configuration having three parallel horizontal regions, a vertical configuration having three parallel vertical regions, or a diagonal configuration having three parallel diagonal regions.

17. The media of claim 12, wherein the one or more characters include one or more letters, one or more numbers, or one or more symbols.

* * * * *